United States Patent
Fuh et al.

(10) Patent No.: US 7,944,475 B2
(45) Date of Patent: May 17, 2011

(54) IMAGE PROCESSING SYSTEM USING MOTION VECTORS AND PREDETERMINED RATIO

(75) Inventors: Chiou-Shann Fuh, Taipei (TW); Jane-Ping Chiu, Taipei (TW); Jing-Fu Chen, Taipei (TW)

(73) Assignee: Inventec Appliances Corp., Taipei (TW)

( * ) Notice: Subject to any disclaimer, the term of this patent is extended or adjusted under 35 U.S.C. 154(b) by 1419 days.

(21) Appl. No.: 11/380,795

(22) Filed: Apr. 28, 2006

(65) Prior Publication Data
US 2010/0302383 A1 Dec. 2, 2010

(30) Foreign Application Priority Data
Sep. 21, 2005 (TW) .............................. 94132716 A

(51) Int. Cl.
*H04N 5/228* (2006.01)
(52) U.S. Cl. .............. 348/208.13; 348/208.1; 348/208.4
(58) Field of Classification Search ............... 348/208.4, 348/208.13, 208.99, 222.1, 252, 208.6
See application file for complete search history.

(56) References Cited

U.S. PATENT DOCUMENTS

| | | | | |
|---|---|---|---|---|
| 5,838,828 | A * | 11/1998 | Mizuki et al. ................. | 382/236 |
| 6,952,234 | B2 * | 10/2005 | Hatano .......................... | 348/363 |
| 6,980,237 | B2 * | 12/2005 | Ohki ........................... | 348/208.6 |
| 7,714,891 | B2 * | 5/2010 | Kawahara ................. | 348/208.99 |
| 7,729,563 | B2 * | 6/2010 | Kameyama et al. .......... | 382/299 |
| 7,733,379 | B2 * | 6/2010 | Hosoda ....................... | 348/222.1 |
| 7,800,664 | B2 * | 9/2010 | Fujiwara ...................... | 348/252 |
| 7,855,731 | B2 * | 12/2010 | Yu ............................... | 348/208.6 |
| 2003/0133035 | A1 * | 7/2003 | Hatano ....................... | 348/362 |
| 2006/0028554 | A1 * | 2/2006 | Usui ........................ | 348/208.99 |
| 2006/0044404 | A1 * | 3/2006 | Hatanaka ................... | 348/208.4 |
| 2006/0044405 | A1 * | 3/2006 | Kawahara ................ | 348/208.99 |
| 2006/0280249 | A1 * | 12/2006 | Poon ........................ | 375/240.16 |
| 2007/0046782 | A1 * | 3/2007 | Helbing et al. ............ | 348/208.4 |

* cited by examiner

*Primary Examiner* — Lin Ye
*Assistant Examiner* — John H Morehead, III
(74) *Attorney, Agent, or Firm* — Wang Law Firm, Inc.; Li K. Wang

(57) ABSTRACT

An image processing apparatus and method is disclosed that is applied for image stabilization. The method comprises the following steps of: At least two images are captured by the image capture module. A sharpest image and a sharper image are selected from the at least two images. At least a motion vector is generated between the sharpest image and the sharper image. The sharpest image is combined with the sharper image based on the motion vector and a combination ratio so as to generate a combined image.

18 Claims, 19 Drawing Sheets

| -1 | 0 | 1 |
|----|---|---|
| -2 | 0 | 2 |
| -1 | 0 | 1 |

FIG. 6

| 1 | 2 | 1 |
|---|---|---|
| 0 | 0 | 0 |
| -1 | -2 | -1 |

FIG. 7

| 23 | 23 | 23 | 23 | 23 | 23 | 24 | 25 | 26 | 25 | 25 | 25 |
|----|----|----|----|----|----|----|----|----|----|----|----|
| 23 | 23 | 23 | 23 | 23 | 23 | 24 | 25 | 25 | 25 | 25 | 25 |
| 23 | 23 | 23 | 23 | 23 | 23 | 24 | 22 | 23 | 23 | 23 | 23 |
| 22 | 22 | 22 | 22 | 22 | 22 | 22 | 22 | 22 | 23 | 23 | 23 |
| 23 | 23 | 23 | 23 | 23 | 23 | 21 | 22 | 22 | 23 | 23 | 23 |
| 21 | 21 | 21 | 21 | 21 | 20 | 19 | 19 | 19 | 19 | 23 | 23 |
| 19 | 19 | 19 | 19 | 20 | 20 | 19 | 18 | 19 | 19 | 23 | 23 |
| 19 | 19 | 19 | 19 | 19 | 19 | 19 | 18 | 19 | 19 | 23 | 23 |
| 16 | 16 | 16 | 19 | 18 | 18 | 18 | 18 | 17 | 17 | 20 | 20 |
| 19 | 19 | 19 | 19 | 18 | 18 | 17 | 17 | 17 | 17 | 20 | 20 |
| 18 | 18 | 18 | 18 | 18 | 18 | 17 | 16 | 16 | 16 | 20 | 20 |
| 18 | 18 | 18 | 18 | 18 | 17 | 17 | 16 | 16 | 16 | 15 | 15 |
| 17 | 17 | 17 | 17 | 17 | 17 | 17 | 16 | 16 | 15 | 15 | 15 |
| 17 | 17 | 17 | 17 | 17 | 16 | 17 | 16 | 15 | 15 | 15 | 15 |
| 19 | 19 | 19 | 19 | 19 | 16 | 17 | 15 | 15 | 15 | 15 | 15 |
| 19 | 19 | 19 | 19 | 19 | 16 | 16 | 15 | 15 | 16 | 15 | 14 |

FIG. 16

IMAGE PROCESSING SYSTEM USING MOTION VECTORS AND PREDETERMINED RATIO

FIELD OF THE INVENTION

The present invention generally relates to an image processing apparatus and its method and, more particularly, to image stabilization.

BACKGROUND OF THE INVENTION

Currently, digital cameras are in widespread use. In digital camera design, there is a mainstream for the digital cameras with slight weight and small volume advantages. Due to the mainstream, a hand-shake movement generated by a user may cause the image blur and low quality easily while the user is photographing objects.

Referring to FIG. 1 and FIG. 2, schematic diagrams illustrate conventional image stabilizations. As shown in FIG. 1, because of a hand-shake movement 13 generated by a user, an object which is imaged to a mark A position 14 originally is imaged to a mark A' position 15. The image movement 16 causes the image blur. As shown in FIG. 2, motion compensation 18 is calculated by a motion detection device (not shown) based on the hand-shake movement 13, and the motion compensation 18 is then transmitted to a compensation device 11. A lens 12 is moved by the compensation device 11 based on the motion compensation 18 and the imaging of the object 17 returns to the mark A position 14 for image stabilization. However, the motion detection device and the compensation device have complex circuits and mechanisms, and therefore the volumes and costs are increased. Due to those disadvantages, a solution must be given by providing an image processing apparatus to eliminate the hand-shake movements completely.

SUMMARY OF THE INVENTION

The primary object of the present invention is to provide an image processing apparatus for image stabilization. The image processing apparatus comprises an image capture module, an image selection module, a motion vector generating module, and an image combination module. The image capture module is used to capture at least two images. The image selection module is used to select a sharpest image and a sharper image from the at least two images. The motion vector generating module is used to generate at least a first motion vector between the sharpest image and the sharper image. The image combination module is used to combine the sharpest image with the sharper image based on the at least a first motion vector and a combination ratio.

The second object of the present invention is to provide a method for image processing, at least comprises the following steps of:
(1) At least two images are captured by the image capture module.
(2) A sharpest image and a sharper image are selected from the at least two images.
(3) At least a motion vector between the sharpest image and the sharper image is generated.
(4) The sharpest image is combined with the sharper image based on the at least a motion vector and a combination ratio to generate a combined image.

BRIEF DESCRIPTION OF THE DRAWINGS

FIG. 6 is a schematic diagram illustrating an example of horizontal edge detection parameters according to an embodiment of the present invention;

FIG. 7 is a schematic diagram illustrating an example of vertical edge detection parameters according to an embodiment of the present invention;

FIG. 16 is a schematic diagram illustrating combination grids according to an embodiment of the present invention;

DETAILED DESCRIPTION OF THE PREFERRED EMBODIMENTS

To make it easier for our examiner to understand the objective of the invention, its innovative features and performance, a detailed description and technical characteristics of the present invention are described together with the drawings as follows.

Figure 1:
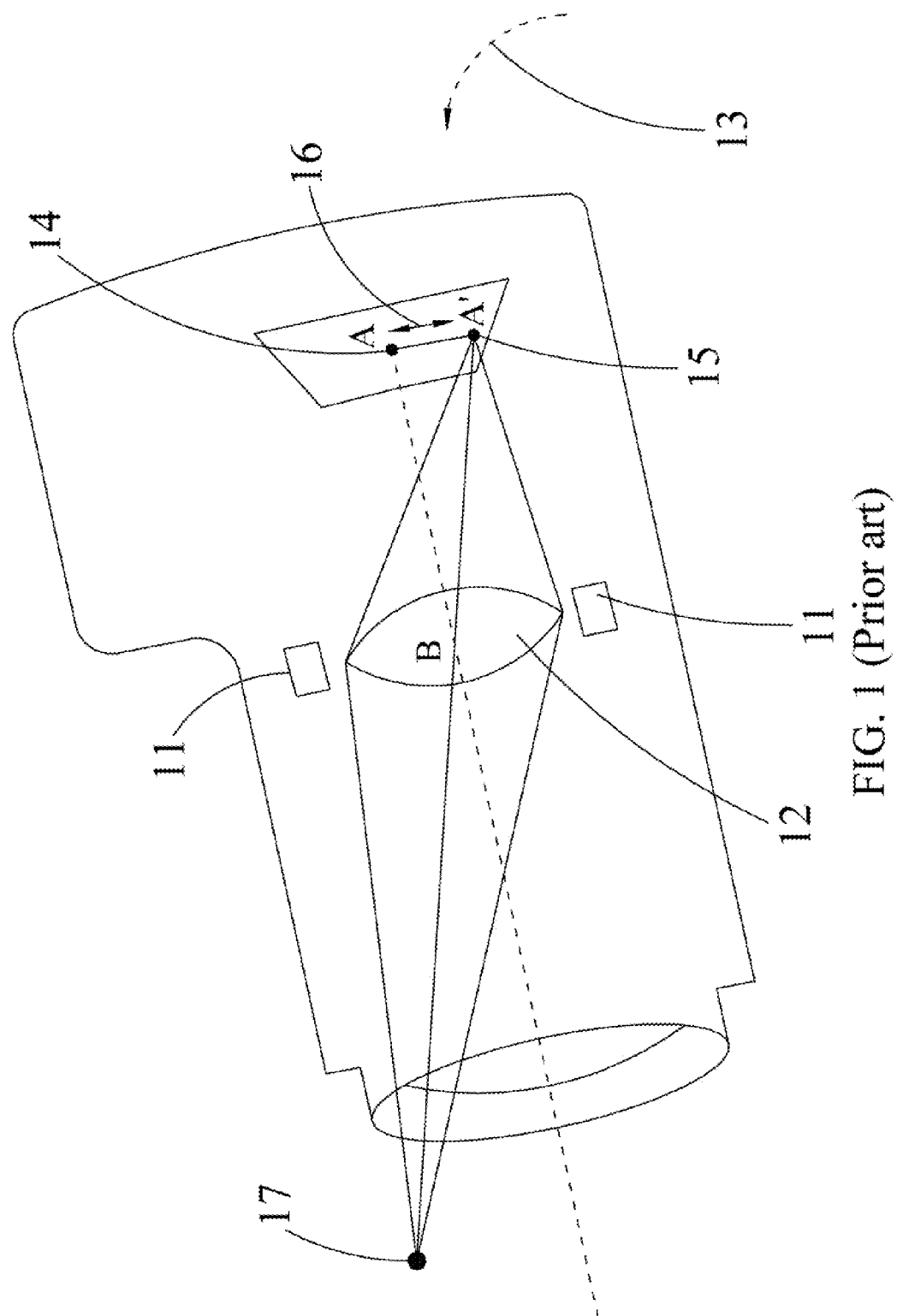
FIG. 1 is a schematic diagram illustrating a conventional image stabilization.
Figure 2:
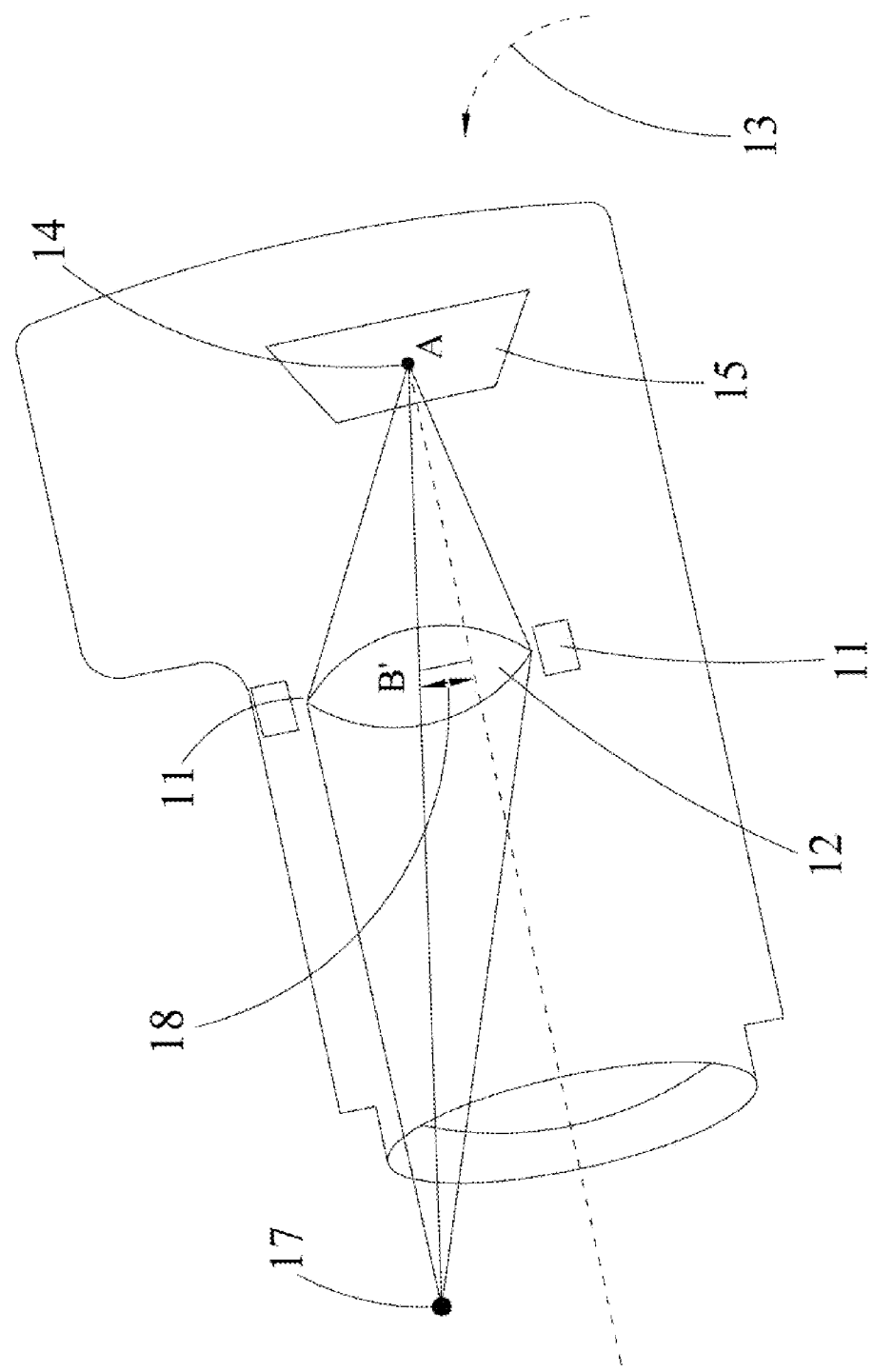
FIG. 2 is a schematic diagram illustrating a conventional image stabilization.
Figure 3:
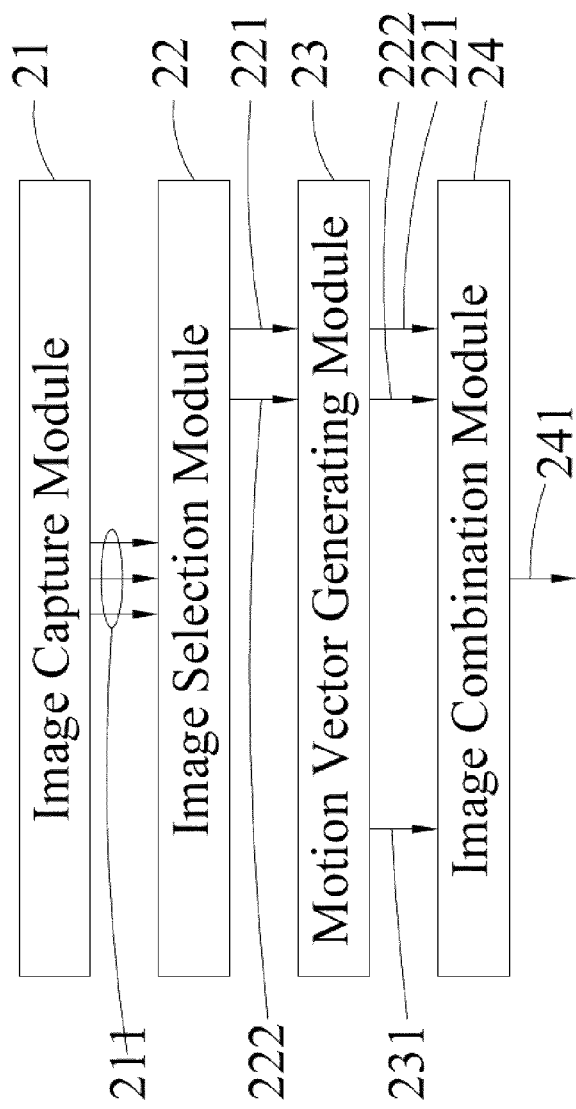
FIG. 3 is a schematic diagram illustrating an image processing apparatus according to an embodiment of the present invention.

Referring to FIG. 3, a schematic diagram illustrates the image processing apparatus according to an embodiment of the present invention. The apparatus comprises an image capture module 21, an image selection module 22, a motion vector generating module 23, and an image combination module 24. The image capture module 21 is used to capture at least two images 211, and the at least two images 211 are then transmitted to the image selection module 22. A sharpest image 221 and a sharper image 222 are selected by the image selection module 22 and are then transmitted to the motion vector generating module 23. At least a first motion vector 231 between the sharpest image 221 and the sharper image 222 is generated by the motion vector generating module 23.

Lastly, the sharpest image 221 and the sharper image 222 are combined by the image combination module 24 based on the first motion vector 231 and a predetermined combination ratio so as to generate a combined image 241.

Figure 4:
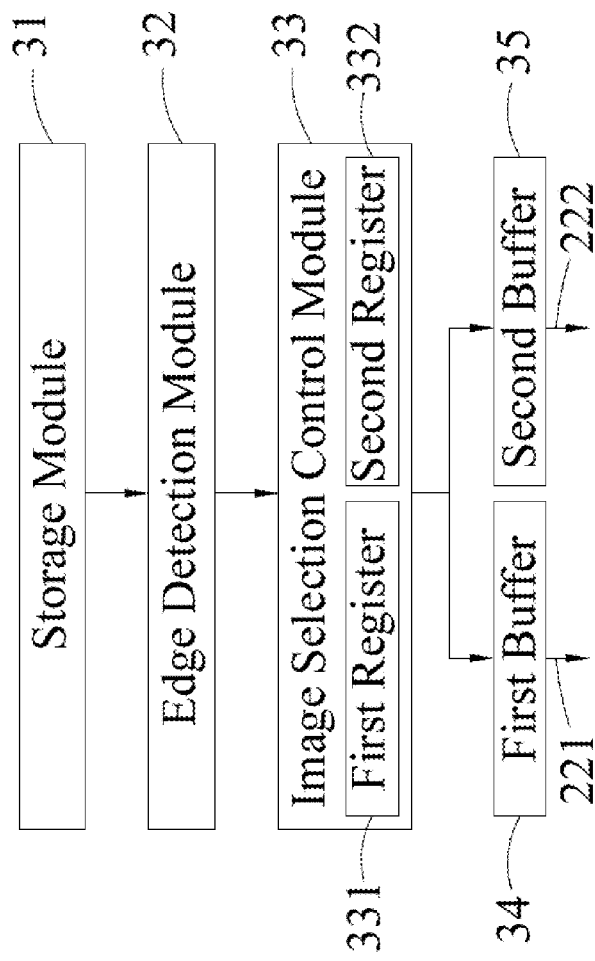
FIG. 4 is a schematic diagram illustrating an image selection module according to an embodiment of the present invention.
Figure 5:
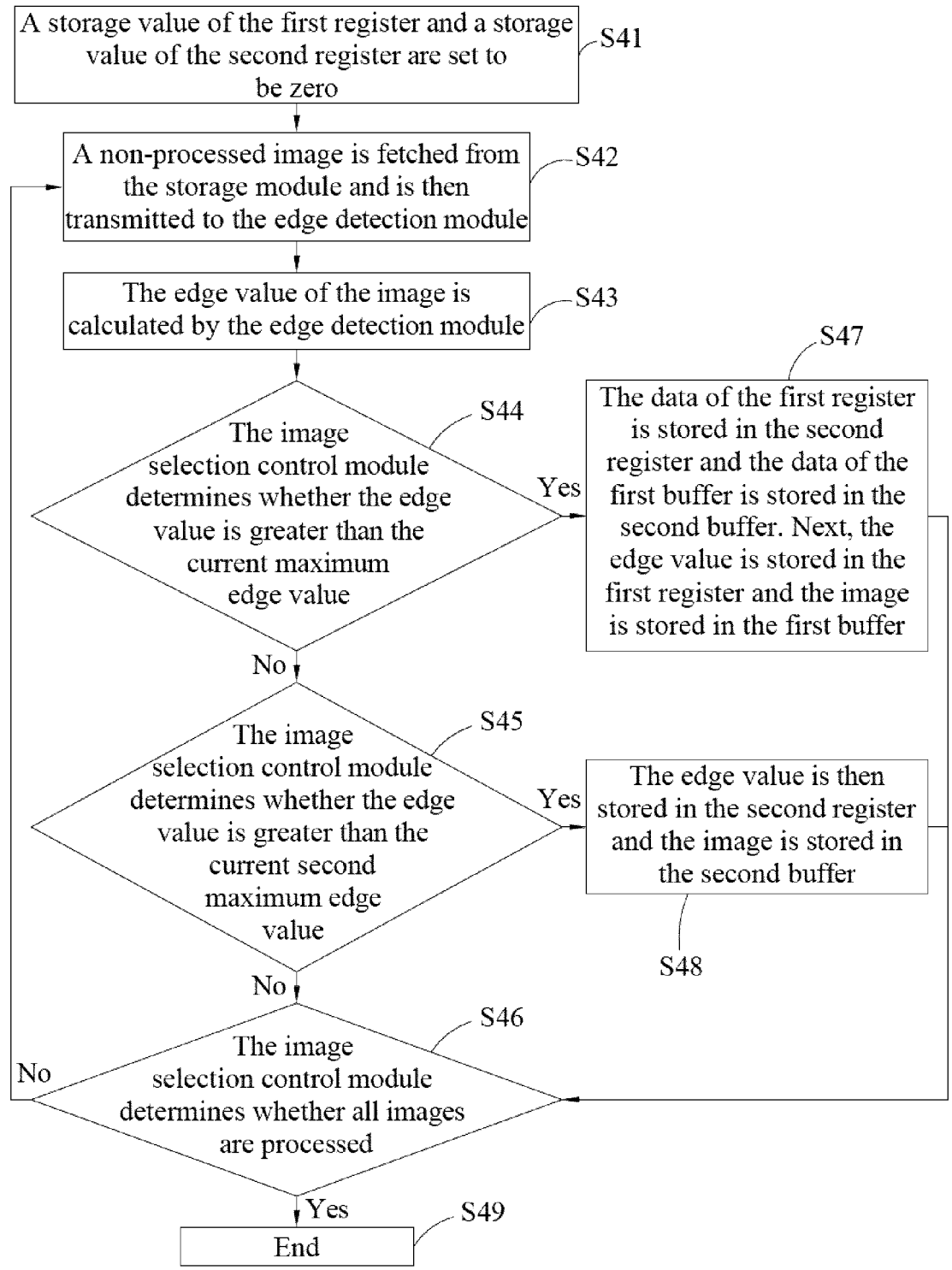
FIG. 5 is a flowchart illustrating the operating of an image selection module according to an embodiment of the present invention.

Referring to FIG. 4 and FIG. 5, a schematic diagram and a flowchart illustrate the image selection module according to FIG. 3. As shown in FIG. 4, the image selection module comprises a storage module 31, an edge detection module 32, a first buffer 34, a second buffer 35, and an image selection control module 33. The image selection control module 33 comprises a first register 331 and a second register 332. The first register 331 is used to store a current maximum edge value. The second register 332 is used to store a current second maximum edge value. The storage module 31 is used to store the at least two images 211 and transmits those images which are not processed yet to the edge detection module 32. The edge detection module 32 is used to calculate an edge value of an image, and the edge value is then transmitted to the image selection control module 33 for comparing the current maximum edge value with the current second maximum edge value. If the edge value is greater than the current maximum edge value, firstly, data stored in the first register 331 is then stored in the second register 332 and data stored in the first buffer 34 is then stored in the second buffer. Next, the edge value is stored in the first register 331 and the image is then stored in the first buffer 34. If the edge value is smaller than the current maximum edge value but is greater than the current second maximum edge value, the edge value is then stored in the second register 332 and the image is then stored in the second buffer 35. The image stored in the first buffer 34 is the sharpest image 221 and the image stored in the second buffer 35 is the sharper image 222 after processing all images.

Referring to FIG. 5, a flowchart illustrates the image selection module 22 according to FIG. 3. The operating procedure of the image selection module 22 comprises the following steps of:

A storage value of the first register and a storage value of the second register are set to be zero S41.

A non-processed image is fetched from the storage module and is then transmitted to the edge detection module S42.

The edge value of the image is calculated by the edge detection module S43.

The image selection control module determines whether the edge value is greater than the current maximum edge value S44.

If the edge value is grater than the current maximum edge value, the data of the first register is stored in the second register and the data of the first buffer is stored in the second buffer. Next, the edge value is stored in the first register and the image is stored in the first buffer S47.

If the edge value is not greater than the current maximum edge value, the image selection control module determines whether the edge value is greater than the current second maximum edge value S45.

If the edge value is greater than the current second maximum edge value, the edge value is then stored in the second register and the image is stored in the second buffer S48.

The image selection control module determines whether all images are processed S46.

all images are not processed, then the procedure returns to step S42.

If all images are processed, the procedure is end S49.

Figure 6:
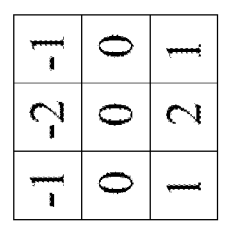
Figure 7:
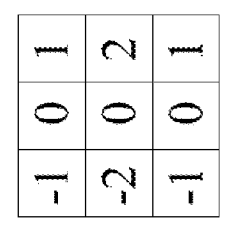
Figure 8:
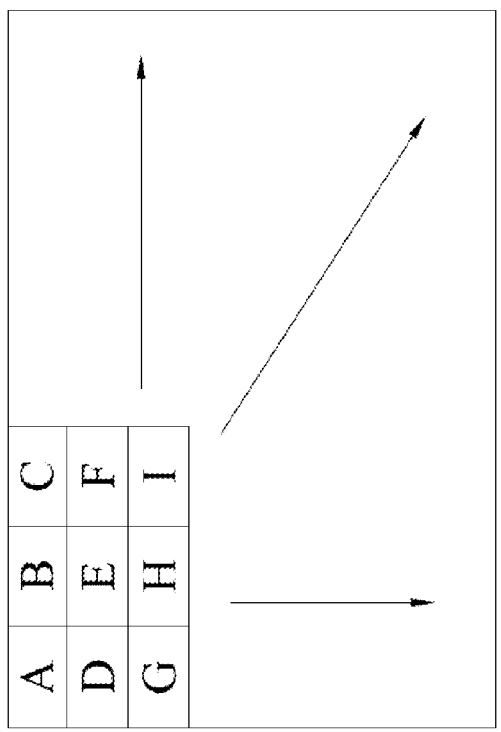
FIG. 8 is a schematic diagram illustrating original image numeric according to an embodiment of the present invention.

Referring to FIG. 6 to FIG. 8, schematic diagrams illustrate the edge detection module 32 according to FIG. 4. Referring to FIG. 6 and FIG. 7, edge detection parameters of the two-dimensional image are showed. The number of the edge detection parameters is usually nine. FIG. 6 shows horizontal edge detection parameters. FIG. 7 shows vertical edge detection parameters. FIG. 8 shows original pixel intensity values of the image, for instance, the edge value of the pixel position E is calculated by following formula:

First, the intensity values of the near pixels of pixel position E, such as pixels in A, B, C, D, F, G, H, and I positions as shown in FIG. 8 must be found.

Second, the horizontal edge value Gh of the pixel position E is calculated by following formula:

$$Gh=(-1)\times A+(-2)\times B+(-1)\times C+(0)\times D+(0)\times E+(0)\times F+(1)\times G+(2)\times H+(1)\times 1$$

The vertical edge value Gv of the pixel position E can be calculated by following formula:

$$Gv=(-1)\times A+(0)\times B+(1)\times C+(-2)\times D+(0)\times E+(2)\times F+(-1)\times G+(0)\times H+(1)\times I$$

Lastly, the edge value g of the pixel position E is equal to the square root of the sum of the vertical edge value Gv squared plus the vertical edge value Gv squared.

The edge values of all pixels as shown in FIG. 8 can be obtained by the formulas of the mentioned above. Furthermore, the edge values of all pixels are then accumulated in order to obtain the edge value of the image.

Figure 9:
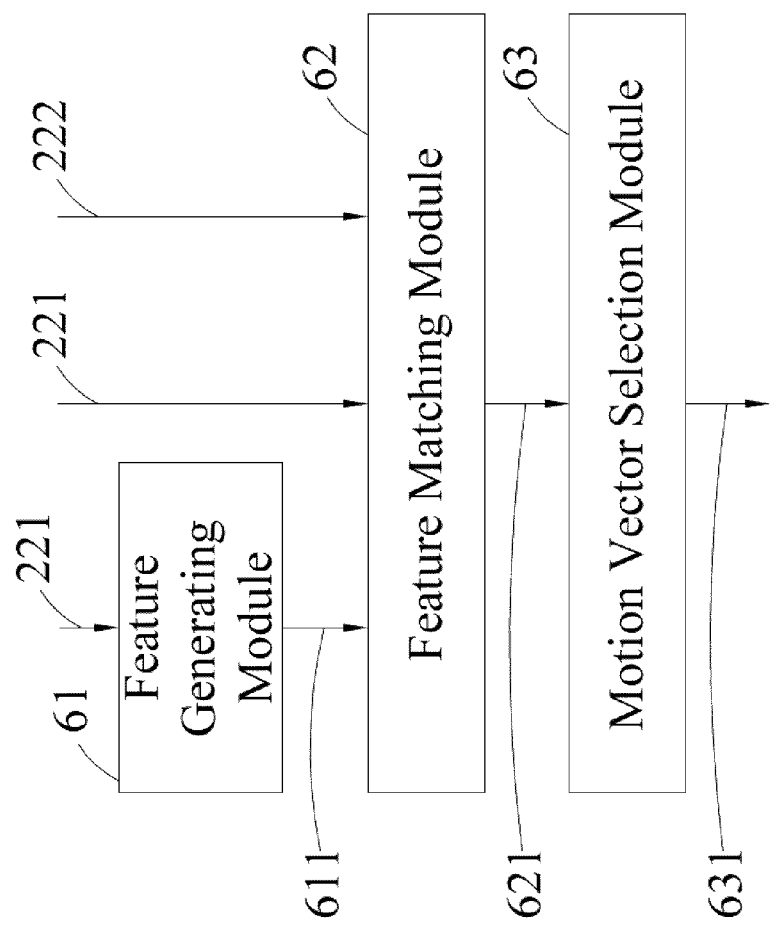
FIG. 9 is a schematic diagram illustrating a motion vector generating module according to an embodiment of the present invention.
Figure 10:
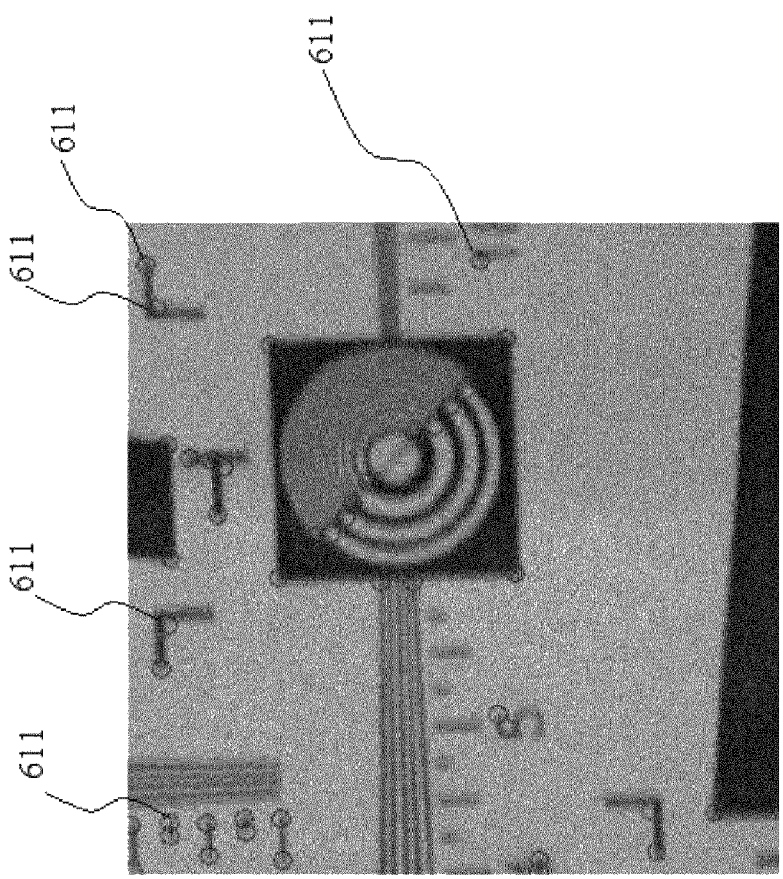
FIG. 10 is a schematic diagram illustrating image features according to an embodiment of the present invention.

Referring to FIG. 9 and FIG. 10, a schematic diagram and a flowchart illustrate the motion vector generating module 23 according to FIG. 3. The motion vector generating module 23 comprises a feature generating module 61, a feature matching module 62, and a motion vector selection module 63. The feature generating module 61 is used to generate at least an image feature 611 of the sharpest image. A matrix is generated by the feature generating module 61 based on the horizontal differences and vertical differences between pixels. An eigenvalue threshold and the eigenvalues of the matrix are utilized to determine whether the pixel is the at least an image feature 611. The image feature generating method of the mentioned above can be found in public literatures, such as Harris and M. Stephens, "A combined corner and edge detector", In Alvey Vision Conference, pp. 147-151, 1988.

Referring to FIG. 10, the image includes forty-three image features. The image features are obtained by the method of the mentioned above and an eigenvalue threshold is set to be 1300. The feature matching module 62 is used to compare the sharpest image with the sharper image based on a matching method and the image feature 611, and generate at least a second motion vector 621. The method of comparison is minimum-square-error method. Lastly, the first motion vector 231 is selected by the motion vector selection module 63 from the second motion vector 621.

Figure 11:
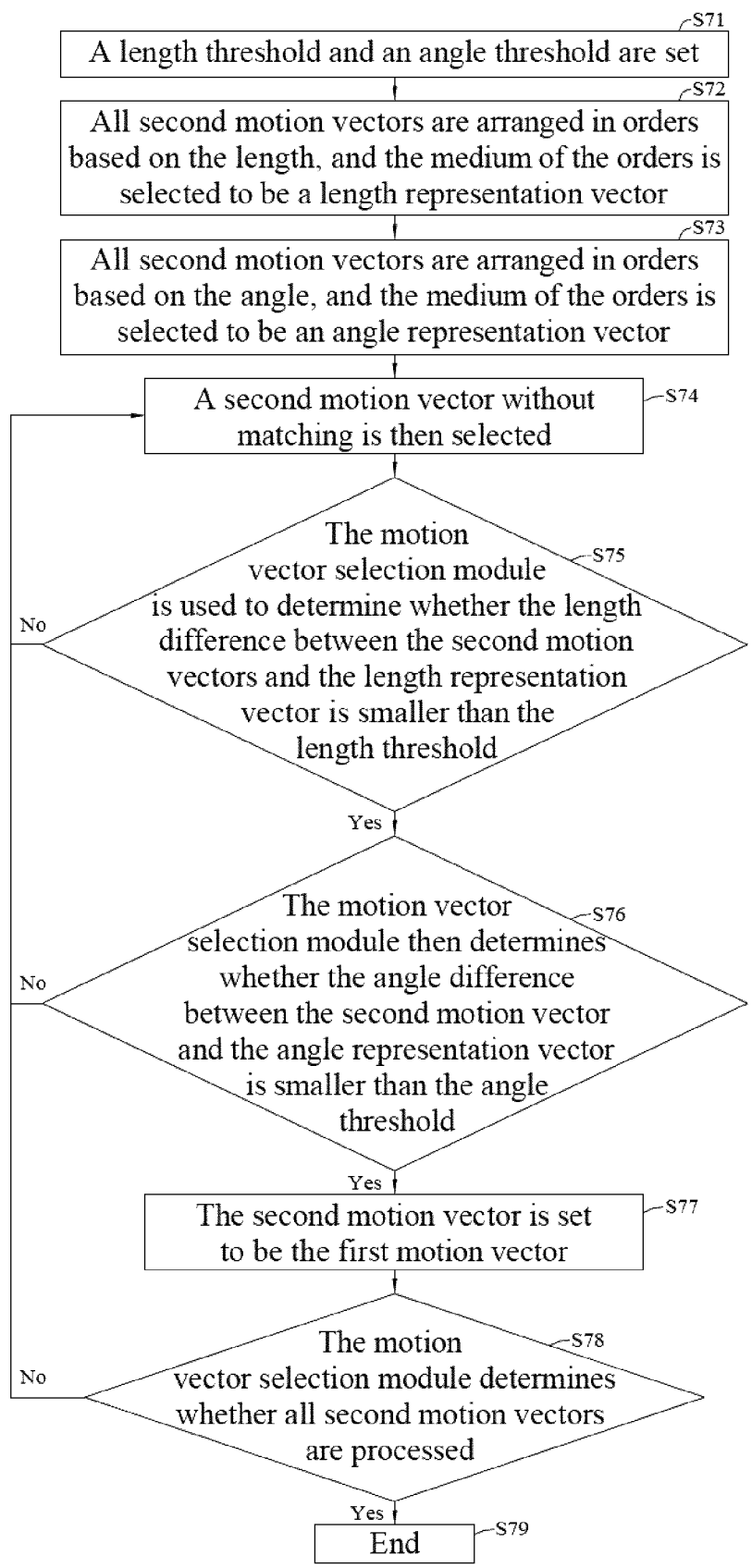
FIG. 11 is a flowchart illustrating the operating of a motion vector selection module according to an embodiment of the present invention.

Referring to FIG. 11, a flowchart illustrates an operating procedure of the motion vector selection module 63 according to FIG. 9. A length threshold and an angle threshold are set S71. All second motion vectors are arranged in orders based on the length, and the medium of the orders is selected to be a length representation vector S72. All second motion vectors are arranged in orders based on the angle, and the medium of the orders is selected to be an angle representation vector S73. A second motion vector without matching is then selected S74. The motion vector selection module is used to determine whether the length difference between the second motion vectors and the length representation vector is smaller than the length threshold S75. If the length difference between the second motion vector and the length representation vector is not smaller than the length threshold, other second motion vector without matching is selected to match S74. If the length difference between the second motion vector and the length representation vector is smaller than the length threshold, the motion vector selection module then determines whether the angle difference between the second motion vector and the angle representation vector is smaller than the angle threshold S76. If the angle difference between the second motion vector and the angle representation vector is smaller than the angle threshold, the second motion vector is set to be the first motion vector S77. If the angle difference between the second motion vector and the angle representation vector is not smaller than the angle threshold, other second motion vector without matching is selected for matching S74. Lastly, the motion vector selection module determines whether all second motion vectors are processed S78. If all second motion vectors are processed, the procedure is end. If all second motion vectors are not processed, other second motion vector without matching is selected for matching S74.

Figure 12:
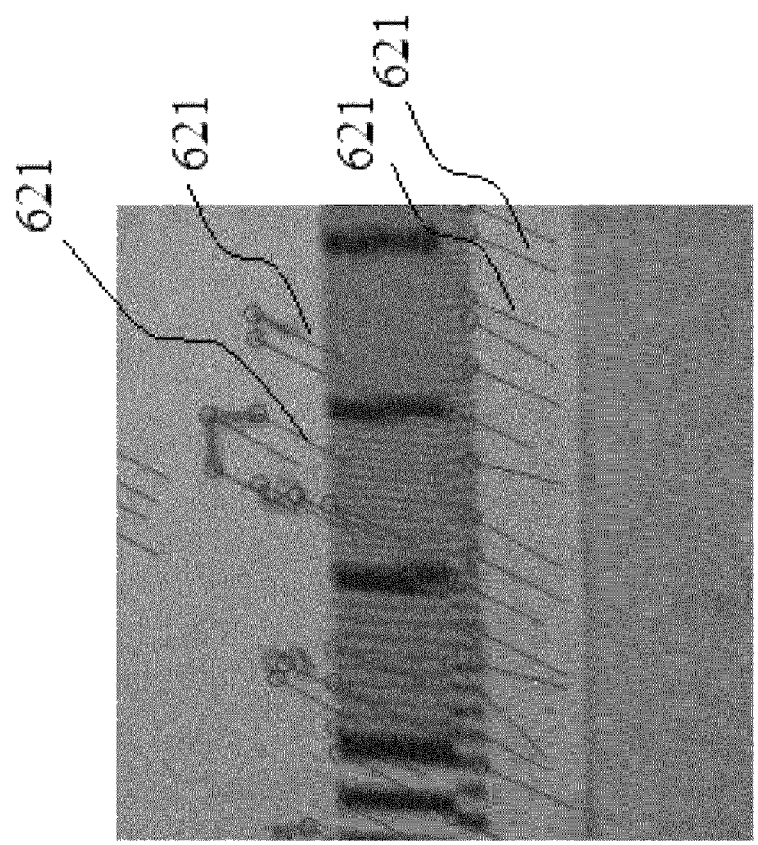
FIG. 12 is a schematic diagram illustrating second motion vectors according to an embodiment of the present invention.
Figure 13:
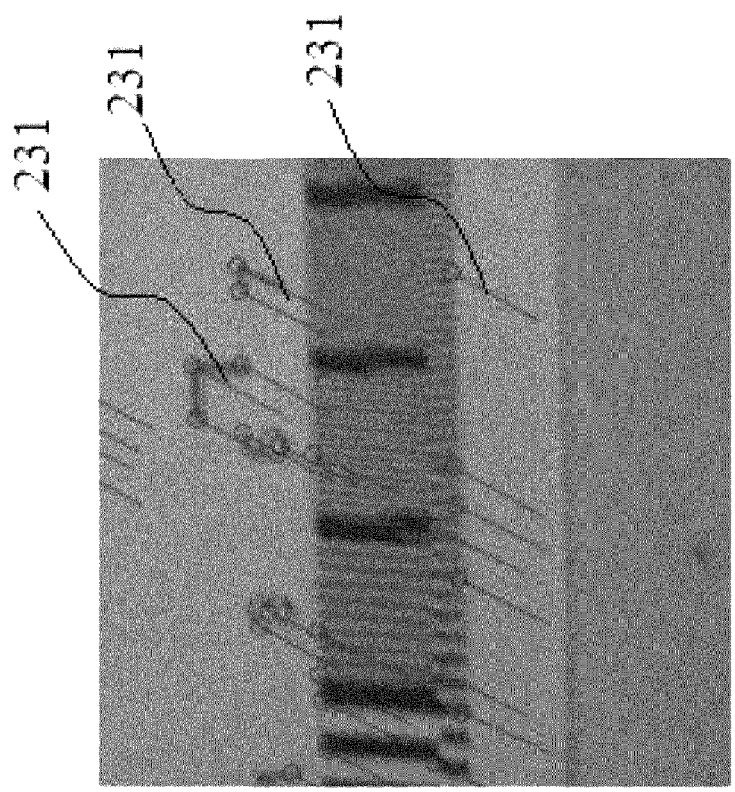
FIG. 13 is a schematic diagram illustrating first motion vectors according to an embodiment of the present invention.

Referring to FIG. 12 and FIG. 13, schematic diagrams illustrate the motion vector selection module according to FIG. 9. As shown in FIG. 12, the feature matching module 62 is used to compare the sharpest image with the sharper image to generate thirty-seven of the second motion vectors 621. The length threshold is set to be ten pixels and the angle threshold is set to be five degree. The first motion vector 231 is selected by the motion vector selection module 63 from the second motion vector 621 based on the length threshold and the angle threshold. As shown in FIG. 13, twenty-eight of the first motion vectors 231 are selected by the motion vector selection module 63 from thirty-seven of the second motion vectors 621.

Figure 14:
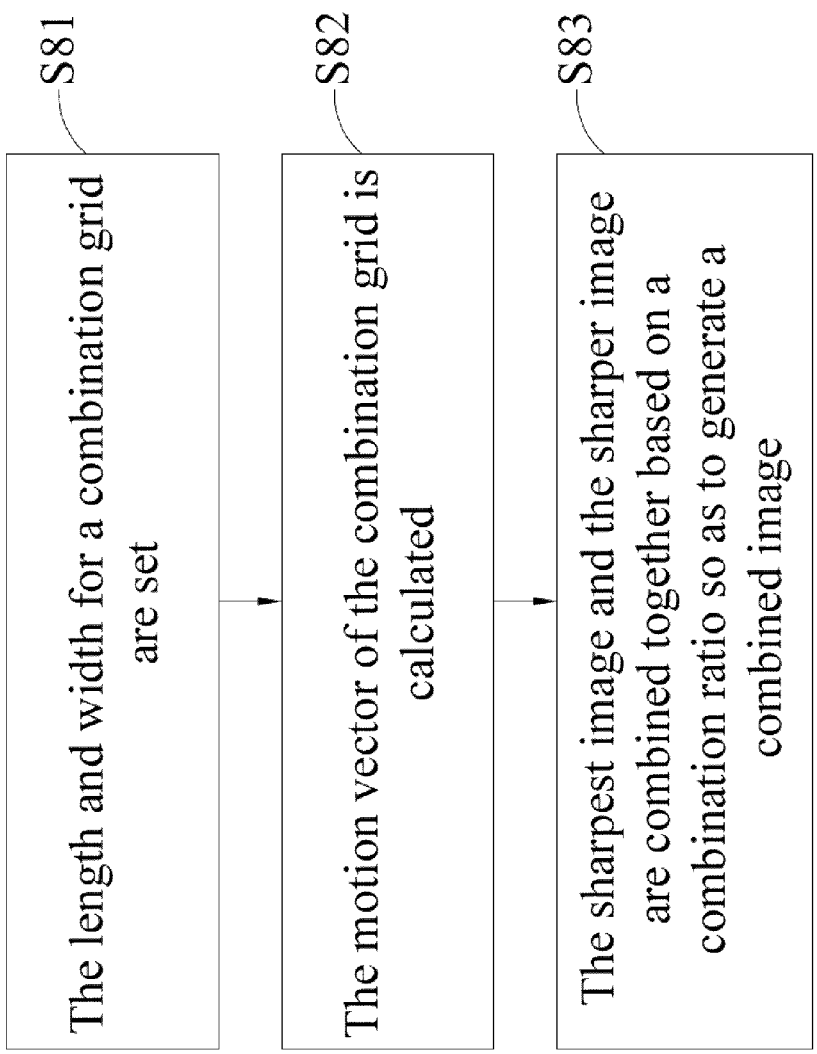
FIG. 14 is a flowchart illustrating the operating of an image combination module according to an embodiment of the present invention.
Figure 17:
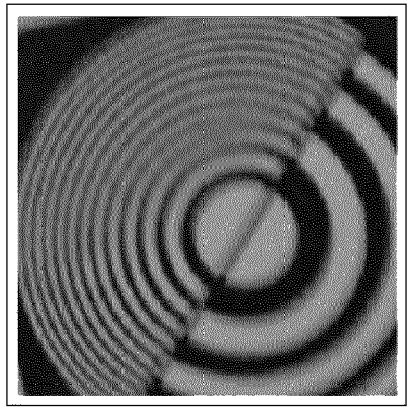
FIG. 17 is a schematic diagram illustrating a sharpest image according to an embodiment of the present invention.
Figure 18:
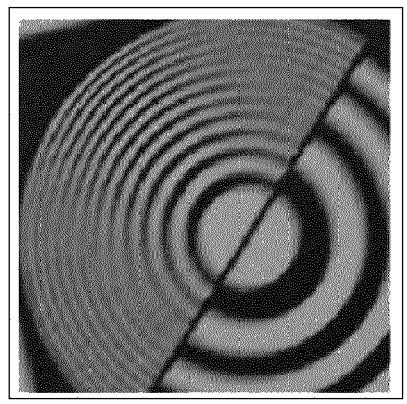
FIG. 18 is a schematic diagram illustrating a sharper image according to an embodiment of the present invention.
Figure 19:
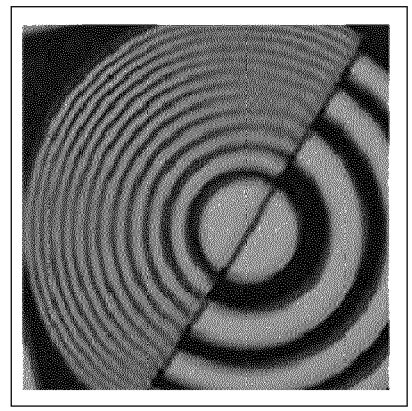
FIG. 19 is a schematic diagram illustrating a combined image according to an embodiment of the present invention.

Referring to FIG. 14 to FIG. 19, schematic diagrams and flowcharts illustrate the image combination module according to FIG. 3. Referring to FIG. 14, firstly, the length and width for a combination grid are set S81. Second, the motion vector of the combination grid is calculated S82. Lastly, the sharpest image and the sharper image are combined together based on a combination ratio so as to generate a combined image S83. The combination ratio is predetermined by a user or is generated from the edge response ratio between the sharpest image and the sharper image, and a proportional factor. For example, when the edge response ratio between the sharpest image and the sharper image is 40:60 and the proportional ratio is 0.4, the combination ratio is (40×0.4):(100−40×0.4)=16:84. In other words, the combined image is generated by combining the sharpest image with the sharper image based on the combination ratio 16:84. FIG. 17 is the sharpest image, FIG. 18 is the sharper image, and FIG. 19 is the combined image.

Figure 15:
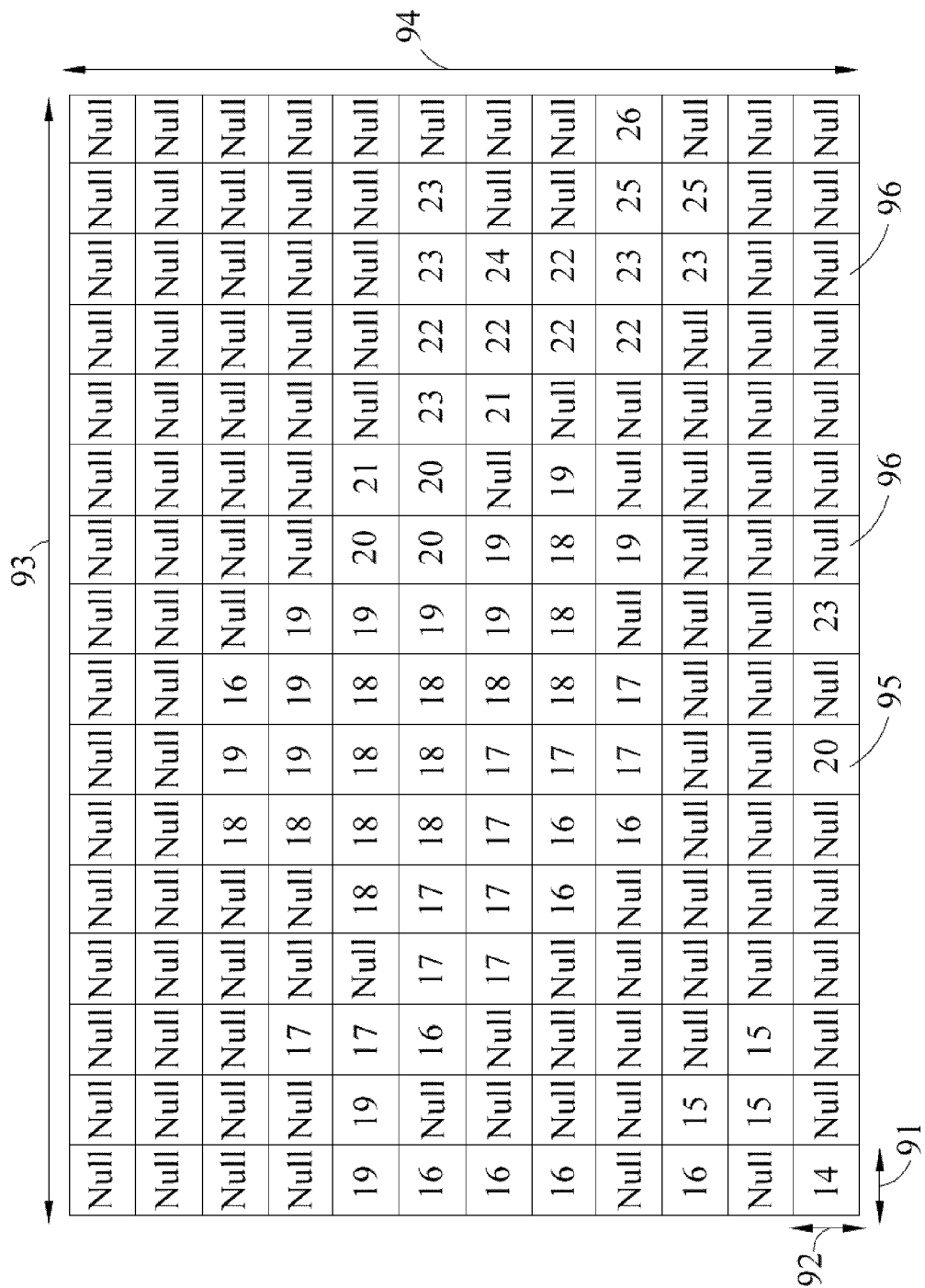
FIG. 15 is a schematic diagram illustrating combination grids according to an embodiment of the present invention.

Referring to FIG. 15, a schematic diagram illustrates the step S82 according to FIG. 14. For example of an image with width 93: 2048 pixels and height 94: 1536 pixels as 1536×2048 Pixel. First, the width 91 of the combination grid is set to be 128 pixels and the width 92 of the combination grid is set to be 128 pixels. If there is at least a first motion vector within the combination grid, such as combination grid 95, then an average value of the first motion vectors is set to be the motion vector of the combination grid 95. If there is no first motion vector within the combination grid, such as combination grid 96, the combination grid 96 is marked as "Null" and the motion vector is generated based on the combination grid with a motion vector like the combination grid 95.

Referring to FIG. 16, a motion vector of twenty is generated in a combination grid 961 based on a motion vector within the combination grid 951. A motion vector of fifteen is generated in a combination grid 962 based on a motion vector within the combination grid 952. Lastly, every combined grid has a motion vector.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the description above, the present invention is novel and useful and definite enhances the performance over the conventional structure and further complies with the patent application requirements and is submitted to the Patent and Trademark Office for review and granting of the commensurate patent rights.

What is claimed is:

1. An image processing apparatus comprising:
   an image capture module for capturing at least two images;
   an image selection module for selecting a sharpest image and a sharper image from the at least two images based on edge values of pixels of the at least two images;
   a motion vector generating module for generating at least one first motion vector between the sharpest image and the sharper image; and
   an image combination module for combining the sharpest image with the sharper image based on said at least one first motion vector and a combination ratio, the combination ratio being predetermined by a user or generated from an edge response ratio between the sharpest image and the sharper image and a proportional factor;
   wherein the motion vector generating module further comprises:
   a feature generating module for generating at least one image feature of the sharpest image;
   a feature matching module for generating at least one second motion vector between the sharpest image and the sharper image by matching the sharpest image and the sharper image based on the at least one image feature; and
   a motion vector selection module for selecting said at least one first motion vector from the at least one second motion vector according to at least one eigenvalue threshold.

2. The image processing apparatus of claim 1, wherein the image selection module further comprises an edge detection module for calculating the edge values of the at least two images.

3. The image processing apparatus of claim 1, wherein the feature generating module is a corner detection module.

4. The image processing apparatus of claim 1, wherein the feature matching module is a minimum-square-error module.

5. The image processing apparatus of claim 1, wherein the at least one eigenvalue threshold is a length threshold.

6. The image processing apparatus of claim 1, wherein the at least one eigenvalue threshold is an angle threshold.

7. The image processing apparatus of claim 5, wherein the selecting from the at least one second motion vector is to compare the length threshold with at least one length difference between the at least one second motion vector and a third motion vector which is a representative motion vector of the at least one second motion vector.

8. The image processing apparatus of claim 6, wherein the selecting from the at least one second motion vector is to compare the angle threshold with at least one angle difference between the at least one second motion vector and a third motion vector which is a representative motion vector of the at least the second motion vector.

9. The image processing apparatus of claim 1, wherein the combination ratio is a sharpness ratio of the sharpest image to the sharper image.

10. A method for image processing applying in an image processing apparatus, comprising the following steps of:
   (a) capturing at least two images;
   (b) selecting a sharpest image and a sharper image from the at least two images;
   (c) generating at least one first motion vector between the sharpest image and the sharper image based on edge values of pixels of the at least two images; and
   (d) combining the sharpest image with the sharper image based on said at least one first motion vector and a combination ratio, the combination ratio being predetermined by a user of generated from an edge response ratio between the sharpest image and the sharper image and a proportional factor;
   wherein the (c) step further comprises:
   (c1) generating at least one image feature of the sharpest image;
   (c2) generating at least one second motion vector between the sharpest image and the sharper image by matching the sharpest image and the sharper image based on the at least one image feature; and
   (c3) selecting said at least one first motion vector from said at least one second motion vector according to at least one eigenvalue threshold.

11. The method of claim 10, wherein the (b) step further comprises calculating the edge values of the at least two images.

12. The method of claim 10, wherein the (c1) step further comprises utilizing a corner detection module to generate the at least one image feature.

13. The method of claim 10, wherein the (c2) step further comprises utilizing a minimum square-error module for matching the sharpest image and the sharper image based on said at least one image feature.

14. The method of claim 10, wherein the eigenvalue threshold is a length threshold.

15. The method of claim 10, wherein the eigenvalue threshold is an angle threshold.

16. The method of claim 14, wherein the (c3) step is to compare the length threshold with at least one length difference between the at least one second motion vector and a third motion vector which is a representative motion vector of the at least one second motion vector.

17. The method of claim 15, wherein the (c3) step is to compare the angle threshold with at least one angle difference between the at least one second motion vector and a third motion vector which is a representative motion vector of the at least one second motion vector.

18. The method of claim 10, wherein the combination ratio is a sharpness ratio of the sharpest image to the sharper image.

* * * * *